US007421433B2

(12) United States Patent
Xu et al.

(10) Patent No.: US 7,421,433 B2
(45) Date of Patent: Sep. 2, 2008

(54) SEMANTIC-BASED SYSTEM INCLUDING SEMANTIC VECTORS

(75) Inventors: Zhichen Xu, Sunnyvale, CA (US); Mallik Mahalingam, Sunnyvale, CA (US); Chunqiang Tang, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1159 days.

(21) Appl. No.: 10/284,093

(22) Filed: Oct. 31, 2002

(65) Prior Publication Data

US 2004/0088282 A1    May 6, 2004

(51) Int. Cl.
G06F 17/30 (2006.01)
(52) U.S. Cl. ........................................... 707/10
(58) Field of Classification Search ............ 707/3, 707/6, 203; 705/26–27; 709/201–203; 711/147–153, 711/155; 712/1–9
See application file for complete search history.

(56) References Cited

U.S. PATENT DOCUMENTS

| 5,287,496 | A | 2/1994 | Chen et al. |
| 5,802,361 | A * | 9/1998 | Wang et al. ................. 382/217 |
| 5,875,479 | A | 2/1999 | Blount et al. |
| 5,990,810 | A | 11/1999 | Williams |
| 6,269,431 | B1 | 7/2001 | Dunham |
| 6,295,529 | B1 * | 9/2001 | Corston-Oliver et al. ....... 707/3 |
| 6,304,980 | B1 | 10/2001 | Beardsley et al. |
| 6,311,193 | B1 | 10/2001 | Sekido |
| 6,487,539 | B1 | 11/2002 | Aggarwal et al. |
| 2002/0138511 | A1 | 9/2002 | Psounis et al. |
| 2002/0150093 | A1 | 10/2002 | Ott et al. |
| 2003/0004942 | A1 * | 1/2003 | Bird .............................. 707/3 |
| 2003/0074369 | A1 * | 4/2003 | Schuetze et al. ......... 707/103 R |
| 2003/0159007 | A1 | 8/2003 | Sawdon et al. |
| 2003/0163493 | A1 | 8/2003 | Burns et al. |
| 2004/0054807 | A1 | 3/2004 | Harvey et al. |
| 2004/0088282 | A1 | 5/2004 | Xu et al. |
| 2004/0098377 | A1 | 5/2004 | Kraft |
| 2004/0098502 | A1 | 5/2004 | Xu et al. |
| 2004/0143666 | A1 | 7/2004 | Xu et al. |
| 2004/0177061 | A1 | 9/2004 | Xu et al. |
| 2004/0181607 | A1 | 9/2004 | Xu et al. |
| 2004/0205242 | A1 | 10/2004 | Xu et al. |
| 2005/0108203 | A1 | 5/2005 | Tang et al. |

OTHER PUBLICATIONS

Gifford, et al., "Semantic File Systems", ACM Operating Systems Review, Oct. 1991, pp. 16-25.*
Mahalingam, M. et al., "Towards A Semantic, Deep Archival File System," Hewlett-Packard Company. Retrieved from the internet on Oct. 31, 2002 (7 pages) (http://www.hpl.hp.com/techreports/2002/HPL-2002-199.pdf).
Cohen et al., "A Case for Associative Peer to Peer Overlays", downloaded Dec. 29, 2005, 6 pages.
Crespo et al., "Routing Indices to Peer-to-Peer Systems", downloaded Dec. 29, 2005, 11 pages.

(Continued)

*Primary Examiner*—Apu Mofiz
*Assistant Examiner*—Kavita Padmanabhan

(57) ABSTRACT

A distributed file system includes a plurality of nodes storing objects; an extractor and a semantic catalogue. The extractor extracts semantic information for the objects. The semantic catalogue includes the semantic information for the objects and may be stored by the plurality of nodes.

22 Claims, 6 Drawing Sheets

OTHER PUBLICATIONS

Crespo et al., "Semantic Overlay Networks for P2P Systems" Google Technologies Inc., Stanford Univ., downloaded Dec. 29, 2005, 16 pages.

Tang et al., "pSearch: Information Retrieval in Structured Overlays" ACM HotNets-I' 02, Princeton, NJ, 2002, 6 pages.

Berry, M. W. et al., "Matrices, Vector Spaces, and Information Retrieval", SIAM Review, 1999, vol. 41, No. 2, p. 335-362.

Deerwester, S. et al., "Indexing by Latent Semantic Analysis", downloaded Jul. 14, 2005, 34 pages.

Fu, K. et al., "Fast and Secure Distributed Read-Only File System", ACM Transactions on Computer Systems, Feb. 2002, vol. 20, No. 1, 24 pages.

Gifford, D. K. et al., "Semantic File Systems", 13th ACM Symposium on Operating Systems Principles, Oct. 1991, 11 pages.

Gopal, B. et al., "Integrating Content-Based Access Mechanisms with Hierarchical File Systems", USENIX, 3rd Symposium on OSDI, Feb. 1999, 15 pages.

Kubiatowicz, J. et al., "OceanStore: An Architecture for Global-Scale Persistent Storage", ASPLOS 2000, 12 pages.

Patterson, H. et al., "SnapMirror: File System Based Asynchronous Mirroring for Disaster Recovery", USENIX, Fast 2002 Conference on File and Storage Technologies, Jan. 2002, 14 pages.

Quinlan, S. et al., "Venti: A New Approach to Archival Storage", downloaded Jul. 14, 2005, 13 pages.

Ratnasamy, S. et al., "A Scalable Content-Addressable Network", ACM SIGCOMM '01, Aug. 2001, 12 pages.

Santry, D. S. et al., "Deciding When to Forget in the Elephant File System", 17th ACM Symposium on Operating Systems Principles, Dec. 1999, p. 110-123.

Tang, C. et al., "PeerSearch: Efficient Information Retrieval in Peer-to-Peer Networks", HP Labs Palo Alto, HPL-2002-198, Jul. 2002, 7 pages.

Weatherspoon, H. et al., "Erasure Coding vs. Replication: A Quantitative Comparison", downloaded Jul. 14, 2005, 6 pages.

Welsh, M. et al., "Querying Large Collection of Music for Similarity", downloaded Jul. 14, 2005, 13 pages.

* cited by examiner

| NAME | INODE # | VER # | SV |
|---|---|---|---|
| HAWAII.JPG | 10 | 1.1 | HAWAIISV |
| REPORT.DOC | 12 | 2.2 | REPORTSV |
| HOT MUSIC.MP3 | 2 | 1 | HOTSV |
| ⋮ | | ⋮ | ⋮ |

210 → HAWAII.JPG row
220 → REPORT.DOC row
230 → HOT MUSIC.MP3 row

FIG. 2

SEMANTIC-BASED SYSTEM INCLUDING SEMANTIC VECTORS

CROSS-REFERENCE

The present invention is related to pending:
U.S. application Ser. No. 10/284,095, filed herewith, and entitled "SEMANTIC HASHING", by Xu et al.; and
U.S. Application Ser. No. 10/284,109, filed herewith, and entitled "SNAPSHOT OF A FILE SYSTEM" by Mahaligam et al.; which are all assigned to the assignee and are incorporated by reference herein in their entirety.

FIELD OF THE INVENTION

The invention is generally related to file systems. More particularly, the invention is related to semantic file systems.

BACKGROUND OF THE INVENTION

Fundamentally, computers are tools for helping people with their everyday activities. Processors may be considered as extensions to our reasoning capabilities and storage devices may be considered as extensions to our memories. File systems, including distributed file systems, are typically provided for accessing data organized in a hierarchal namespace, such as a directory tree, on storage devices, but the gap between the human memory and the simple hierarchical namespace of existing file systems makes these file systems hard to use.

The human brain typically remembers objects based on their contents or features. For example, when you run into an acquaintance, you may not remember the person's name, but you may recognize the person by features, such as a round face and a shiny smile. These identifying features are known as semantics or semantic information.

To bridge the gap between the human memory and the hierarchical namespace of existing file systems, people have used either separate tools or file systems that integrate rudimentary search capabilities. Tools such as GREP and other local search engines have to exhaustively search every document to match a pattern for identifying a document.

Some known semantic file systems, such as Semantic File System (SFS) and Hierarchy and Content (HAC), organize a namespace by executing queries based on semantic information and constructing the namespace with the results of the queries. For example, a directory in HAC may be created with all files that match the results of a query. These file systems, however, provide only simple keywords-based searches, and these file systems do not maintain any indices for minimizing retrieval times.

Also, known semantic file systems do not typically support archival functions, such as versioning. Generally, the most arduous task in restoring a backed up version is to find the desired file and the desired version of the file. Currently, the only way to locate the version is by remembering the date that the version was produced. In many cases, people are interested in files produced by other people, and are interested in versions with certain features. For example, in a digital movie studio an artist may make many variations of video clips. To produce a video clip, the artist may perform several editing iterations until the clip has the desired look and feel of the artist. In the process, the artist may go back to one or more previous versions, which may not be the latest version. Also, the artist may need to incorporate scenes produced by other artists, but the artist may not know the file name or correct version of the file including scenes to be incorporated. Instead, the only thing the artist may know is that these files have certain semantics. This situation arises in a variety of applications and environments, including universities, research laboratories, and medical institutions, etc.

SUMMARY OF THE INVENTION

According to an embodiment of the invention, a semantic-based system comprises at least one client operable to issue a query; and a file system storing objects and connected to the client. The file system is operable to store semantic information for objects that is searchable to execute the query.

According to another embodiment of the invention, a distributed file system comprises a plurality of nodes storing objects; at least one extractor extracting semantic information for the objects; and a semantic catalogue including the semantic information for the objects, wherein the semantic catalogue is stored in the plurality of nodes.

According to yet another embodiment of the invention, a node in a semantic-based distributed file system comprises a processor, a storage device storing objects, and a semantic catalogue containing semantic information for the objects. The processor is operable to execute an extractor for extracting the semantic information.

According to yet another embodiment of the invention, a method for searching a semantic-based file system comprises receiving a semantic query, wherein the query identifies at least one semantic; searching semantic vectors stored in the file system for the semantic; and generating a result of the search.

According to yet another embodiment of the invention, a semantic-based file system comprises means for receiving a semantic query, the query identifying at least one semantic; means for searching semantic vectors stored in the file system for the at least one semantic, wherein each semantic vector is associated with an object stored in the file system, and means for generating a result of the search.

According to yet another embodiment of the invention; a method of performing a write operation in a semantic archival file system comprises receiving a new version of a file stored in the file system; computing a diff for the new version and the file; storing the diff in the file system in response to the diff being less than a threshold.

BRIEF DESCRIPTION OF THE DRAWINGS

The present invention is illustrated by way of example and not limitation in the accompanying figures in which like numeral references refer to like elements, and wherein:

FIG. 2 illustrates a semantic catalogue, according to an embodiment of the invention;

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1A:
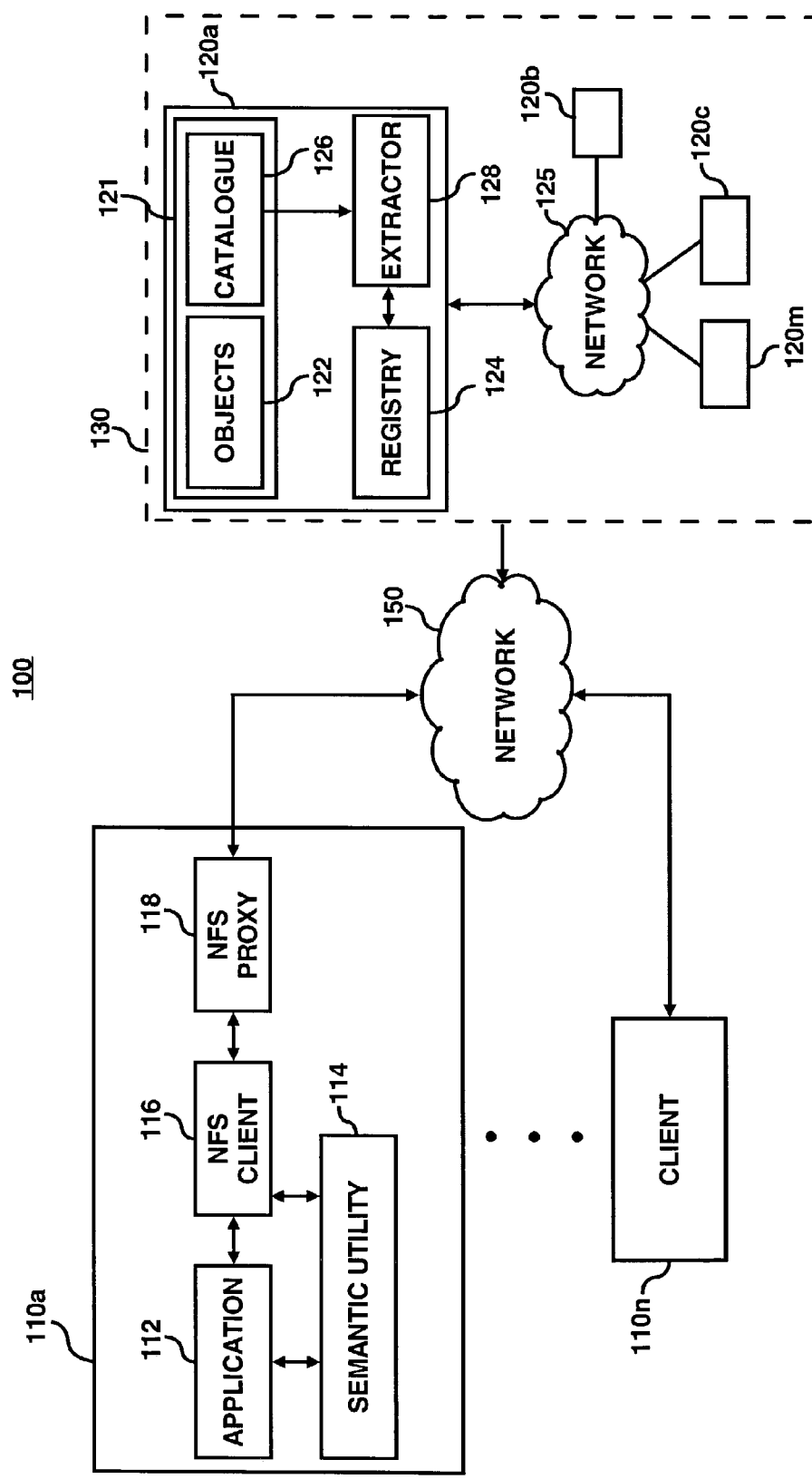
FIG. 1A illustrates a semantic-based system, according to an embodiment of the invention.

FIG. 1A illustrates an exemplary block diagram of a system 100 where an embodiment of the present invention may be practiced. It should be readily apparent to those of ordinary skill in the art that the system 100 depicted in FIG. 1 represents a generalized schematic illustration and that other components may be added or existing components may be removed or modified without departing from the spirit or scope of the present invention.

As shown in FIG. 1, the system 100 comprises a semantic archival system. The system 100 provides a semantic-based interface that allows clients to locate files according to the semantics in the files.

The system 100 includes clients 110a . . . n connected to a distributed archival file system (dafs) 130 via a network 150. According to an embodiment of the invention the dafs 130 may include a peer-to-peer (P2P) system having nodes 120a . . . m connected via a network 125. It will be apparent to one of ordinary skill in the art that a client may also be a node in the dafs 130. Furthermore, the networks 125 and 150 may include one or more of the same networks. By using a P2P system, the dafs 130 may benefit from vast storage capabilities of P2P systems, which can allow the dafs 130 to store substantially every version of an object (e.g., files, directories, documents, etc.). It will be apparent to one of ordinary skill in the art that the dafs 130 is not limited to a P2P system and may use other types of distributed systems.

In the dafs 130, each time a file is modified and closed, a new version of the file is produced. Different instances of the same file will be given a different version number. The metadata, however, may not be versioned, but the dafs 130 supports a virtual snapshotting which uses timestamps. Virtual snapshotting allows accessing the namespace arbitrarily back in time, and is described in detail in a co-pending application entitled, "Snapshot of a File System" by Mahalingam et al., and incorporated by reference above.

The dafs 130 includes a storage 121 storing objects 122 (e.g., files, directories, etc.) and a semantic catalogue 126 including semantic vectors. The dafs 130 also includes an extractor 128, and an extractor registry 124. The semantic catalogue 126 is metadata that describes the semantics of each object 122. The semantic catalogue may be a distributed index stored in the nodes 120a . . . m. The semantic catalogue 126 contains an index of semantic vectors for objects in the dafs 130. A semantic vector includes semantic information about an object. The semantic information may be related to predetermined features that can be extracted from an object. A semantic vector may be file-type specific, such that predetermined features are extracted for each object file type. The semantic vector may include a bit wise representation in the semantic catalogue 126.

The predetermined features in a semantic vector may be extracted from an object's contents, such as features extracted from contents of a file. For example, text file features, such as word or term frequency information, are extracted from text documents to derive a semantic vector for the text file. Known latent semantic indexing techniques, such as matrix decomposition and truncation, may be used to extract information for creating the semantic vector. For music files, known techniques for deriving frequency, amplitude, and tempo features from encoded music data may be used to create semantic vectors. Additionally, one or more semantic vectors may be provided for other file types.

Figure 1B:
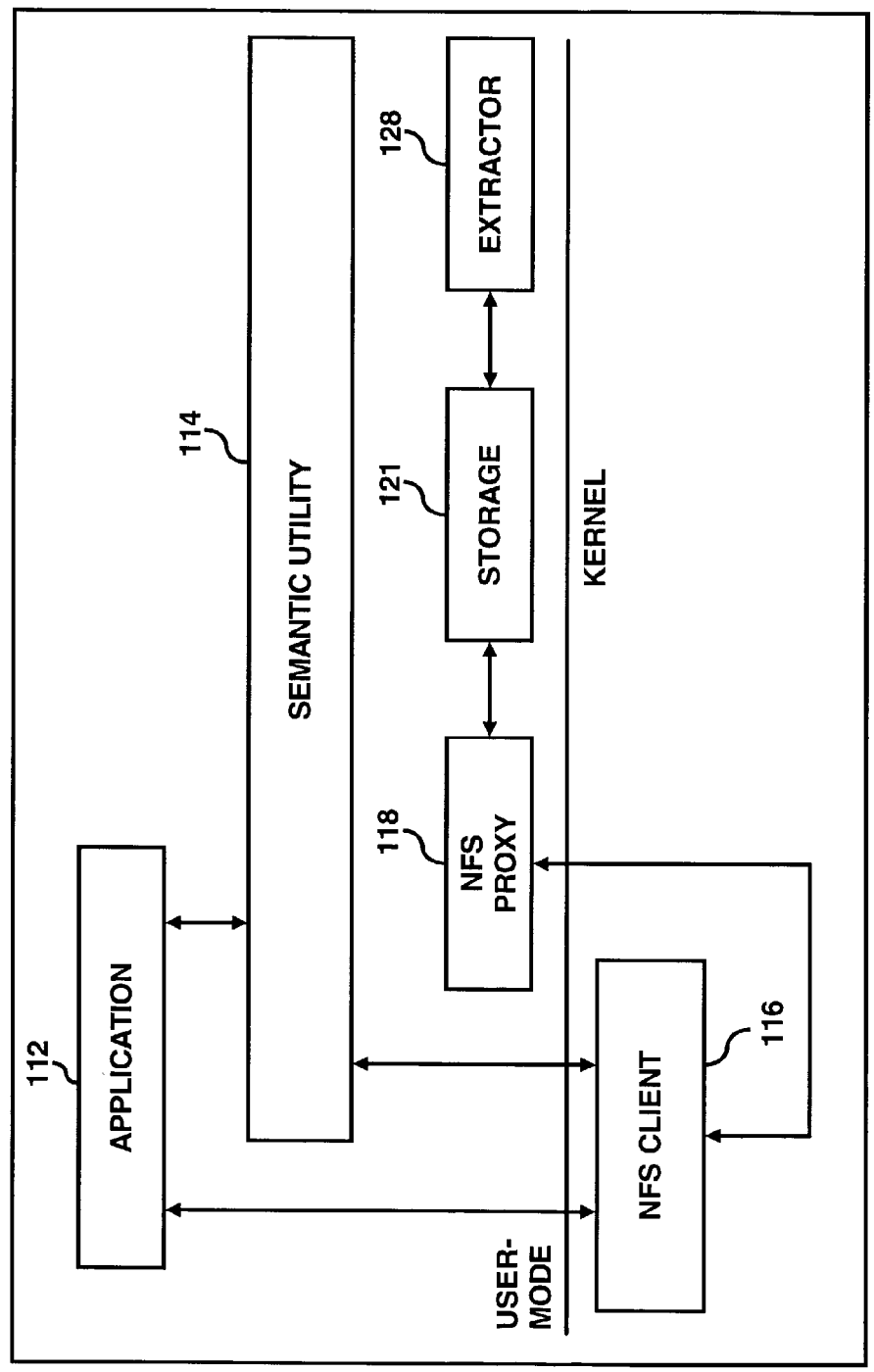
FIG. 1B illustrates a layered view of a system architecture of the system shown in FIG. 1A.

FIG. 1B illustrates a layered view of the system architecture for the system 100 shown in FIG. 1A. The application 112 and the semantic utility 114 communicate with the daib 130 via the NFS client 116 and the NFS proxy 118. The semantic utility 114 may access the semantic catalogue 126 and the objects 122 in the storage 121 (i.e., distributed storage) of the dafs 130. The storage 121 is also connected to the extractor 128 for extracting and storing semantic vectors and performing other functions.

FIG. 2 illustrates entries 210-230 in the semantic catalogue 126. The fields of the catalogue 126 include, among others, file name, Inode, version number, and semantic vector. The Inode is a unique identifier of an object in the dafs 130. An Inode in the dafs 130 is similar to an Inode in a traditional UNIX file system, however, an Inode in the dafs 130 is a unique identifier in a distributed file system.

Besides the metadata included in a traditional file system such as owner and permissions, an Inode in system 100 may also include the following information for each version of a file: version number, reference to the base file Inode, version number of the base file, (a "file Inode" and a "version number" may be used to uniquely identify a particular version of a file), reference to the diff Inode, and the identifier of the function to reconstruct the file content from the base file and the diff. The storage capabilities of the P2P platform may allow for storage of substantially every version of a file and an Inode for every version. Therefore, Inodes in the system 100 may include information regarding substantially every version of a file.

The entry 210 in FIG. 2 is for the file hawaii.jpg. It is located at Inode 10 and is version 1.1. A semantic vector HAWAIISV may be derived based on predetermined features of JPEG files. The entry 220 is for report.doc. It is located at the Inode 12 and is version 2.2. A semantic vector REPORTSV may be derived based on predetermined features of doc files. The entry 230 is for the file hot music.mp3. It is located at Inode 2 and is version 1. A semantic vector HOTSV may be derived based on predetermined features of MP3 files.

The catalogue 126 may include other fields, such as Inode of a base document and identification of a diff. The dafs 130 may use a diff function to derive differences between a new version and a previous version. Instead of storing each new version, just the differences (i.e., a diff) between the new version and the old version are stored to conserve storage. Co-pending application, entitled "Semantic Hashing in a File System" by Xu et al., incorporated by reference above, describes storing diffs for conserving storage. Other fields in the catalogue 126 may include owner, creation timestamp, invisible_after timestamp, etc.

The dafs 130 also includes an extractor registry 124, such as in the nodes 120a . . . m. The extractor registry 124 lists all the extractors available for creating semantic vectors. An extractor 128 is connected to the extractor registry 124. The extractor 128 may include a plug-in for creating semantic vectors. Multiple extractors, wherein each extractor may be specific to a file type, may be stored for creating semantic vectors for different file types. For data of unknown types, statistical analysis can be used to derive features from a file. Each extractor may utilize known algorithms for extracting semantic information to create a semantic vector for a file. Both the extractor 128 and the extractor registry may include software executed at a node in the dafs 130.

A node 120a, for example, may write a new object to the storage 121. The extractor registry may be consulted to determine which extractor is used to automatically create a semantic vector for the new object. The extractor registry 124 may also provide an extensible interface that allows new extractors and diff functions to be added.

The system 100 also includes one or more of the clients 110a . . . n which perform data operations on the dafs 130. Data operations may include conventional network file system operations to access file and directory systems in the dafs 130, such as cd, ls, mkdir, mv, rm, etc. The dafs 130 also executes additional commands for executing semantic-based queries and utilizing information in the semantic catalogue 126. The clients 110a . . . n may include application(s) 112 reading/writing information to the dafs 130.

A semantic utility 114 is also included in the clients 110a . . . n. The semantic utility 114 offers semantic-based retrieval capabilities by interacting with the dafs 130. The semantic utility 114 may include a user interface allowing a user to create and execute a semantic-based query.

The semantic utility 114 interacts with the dafs 130 to generate materialized views of query results. Users can access these materialized views as regular file system objects. For example, a user can execute commands using the semantic utility 114 to create results of a query into a directory, such as using the following commands:

sdr-mkdir cn;

sdr-cp "similar to 'hawaii.jpg'" cn.

The directory cn contains links to files that are semantically close to the sample file, hawaii.jpg. Directories like "cn" are called semantic directories, which can be accessed as a regular directory. Note that the command sdr-cp "similar to 'hawaii.jpg'" cn is a semantic-based query which can be used to view and later retrieve files similar to "hawaii.jpg."

Semantic-based queries include one or more features for identifying objects having the features. These features may be associated with one or more of the features extracted from the objects 122 to create the semantic vectors. Semantic-based queries can also be constrained. Typical constraints may include time and namespace. For example, a user can search for files created after Jan. 1, 1999 by issuing a command (e.g., sdr-ls "after Jan. 1, 1999"). Similarly, the user can search for files under a list of directories (e.g., sdr-ls "computer networks' under /etc, cn/; before Jan. 1, 1999"). The directories can be "semantic directories" with a hierarchal file system employed on the nodes 110a . . . n functioning as peers in a P2P system.

The NFS client 116 and the NFS proxy agent 118 include software allowing a user to connect to the dafs 130. The NFS client 116 provides backward compatibility for the application 112 to use the dafs 130. The NFS proxy agent accepts NFS requests and other requests specific to the dafs 130 and converts the requests to a protocol understood by the dafs 130. Although not shown, the nodes 120a . . . m may include similar application program interfaces allowing the nodes 120a . . . m to execute file system commands.

Figure 3:
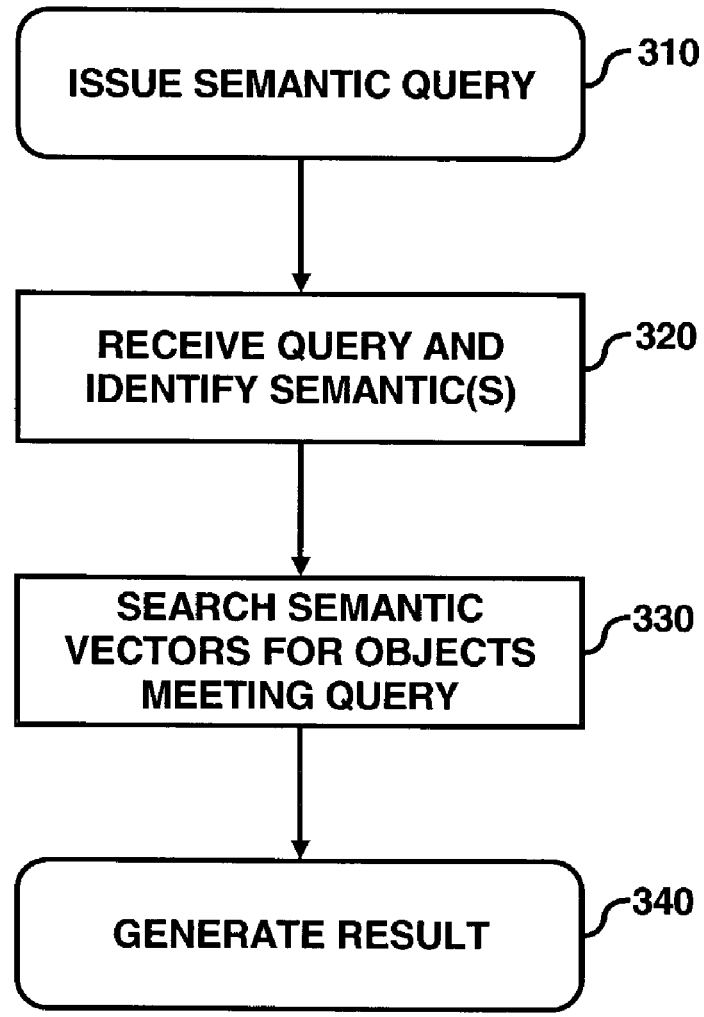
FIG. 3 illustrates a flow diagram of a method for searching a semantic-based file system, according to an embodiment of the invention.

FIG. 3 illustrates a method 300 for retrieving an object using a semantic vector, according to an embodiment of the invention. In step 310 a semantic query is issued by a user which results in a search for one or more objects using one or more semantics identified from the query. For example, the command sdr-cp "similar to 'hawaii.jpg'" cn is a semantic-based query which results in a search for objects similar to Hawaii.jpg. Semantics for the search are retrieved from HAWAIISV. Another example may include a user deriving a semantic vector for a document. Then, the user uses the derived semantic vector to search for similar documents in the dafs 130.

A semantic search based on semantic vectors can be file-type specific. Generally speaking, some kind of Euclidian distance between semantic vectors of two files may be used to measure the similarity of the two files. For instance, in text file searches, the similarity between two files (or a query and a file) is measured as the cosine of the angle between their corresponding semantic vectors. For other media such as video and audio, other techniques may be used to detect similarities between semantic vectors.

In step 320, the dafs receives the semantic query and identifies one or more semantics in the query. These semantics are used to search for objects in the dafs 130 having similar semantics.

In step 330, the dafs 130 searches semantic vectors in the semantic catalogue 126 to identify objects meeting the query. For example, semantic vectors are identified that have the semantics from the query.

In step 340, the dafs 130 generates a result of the search. For example, the directory cn is created including the results of the search. A user may use the semantic utility 114 to view results of a query. Steps for generating the result may also include identifying at least one object from the catalogue meeting the query; identifying location of the object in the dafs 130 from the semantic catalogue; and retrieving the object from the location for transmission to the client.

Figure 4:
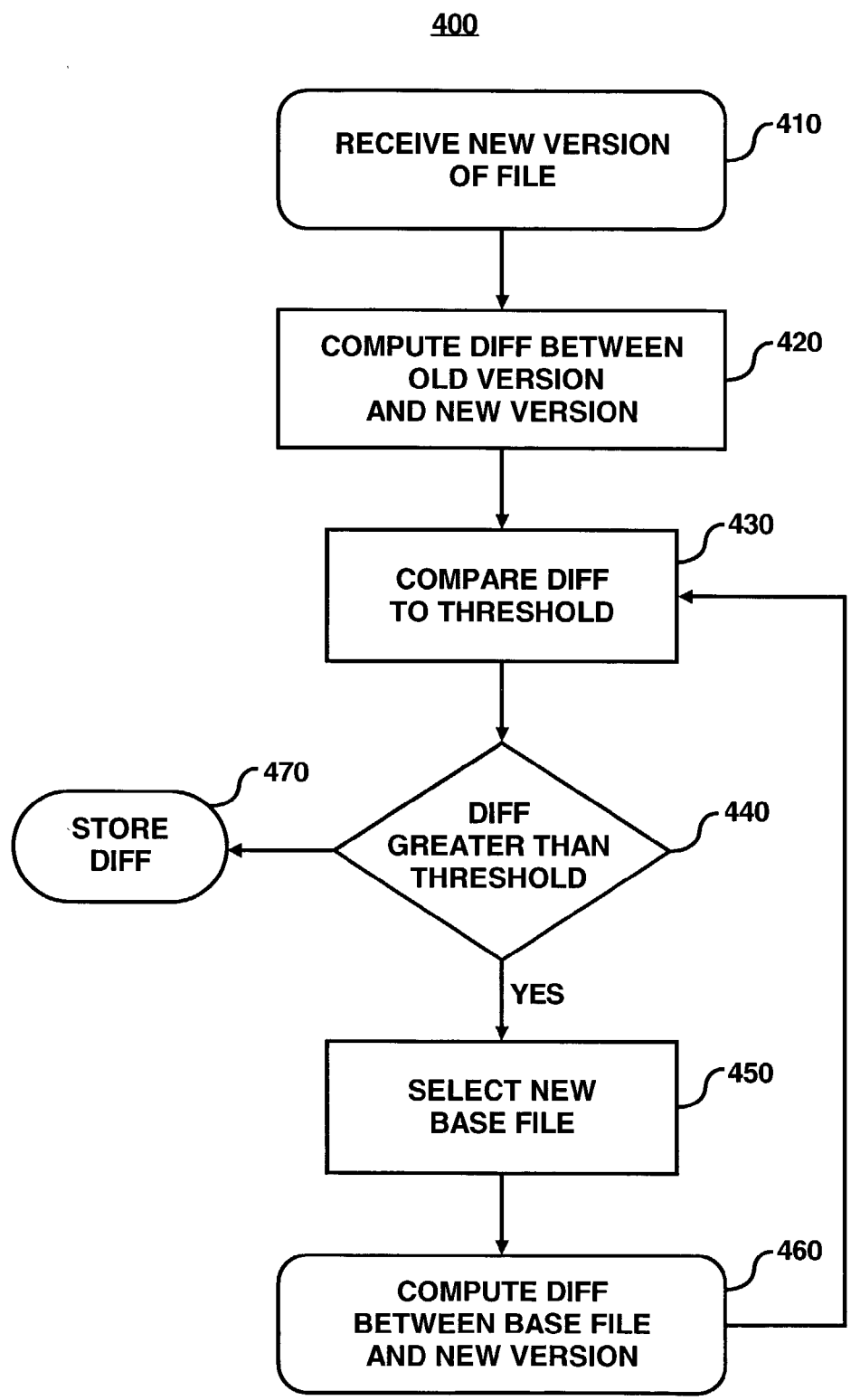
FIG. 4 illustrates a method for performing a write operation, according to an embodiment of the invention.

FIG. 4 illustrates a method 400 for writing a new version of a file in the dafs 130, according to an embodiment of the invention. For example, an existing file (i.e., the old version) in the dafs 130 may be modified. The modified document (i.e., the new version) is saved in the dafs 130 by performing a write operation.

In step 410, the dafs 130 receives the new version. In step 420, the dafs 130 computes the diff between the old version and the new version. In step 430, the dafs 130 compares the diff to a threshold. In step 440, the dafs 130 determines whether the diff is greater than the threshold. If the diff is greater than the threshold, then the dafs 130 selects a new, semantically-close, base file for computing a diff (step 450). For example, the dafs 130 generates a semantic vector for the new version. Then, the dafs 130 compares semantic vectors in the catalogue 126 to the semantic vector for the new version to identify a similar semantic vector. A file having a similar semantic vector is selected as the new base document. The dafs 130 computes a diff between the base document and the new version (step 460). If this diff is greater than the threshold, then another base file is selected and generally the steps 430-460 are repeated.

In step 440, if the diff is not greater than the threshold, then the diff is stored in the dafs 130 (step 470). An entry is created in the catalogue 126 for the new version including a semantic vector for the new version. For a read operation, the new version may be generated from the stored diff and transmitted to the client requesting the file.

The method 400 includes steps for generating a new version of an existing document. It will be apparent to one of ordinary skill in the art that new documents may also be stored in the dafs 130 and semantic vectors may be generated for the new document. A new document may be selected as a base document, such as during the step 450. Also, a new document may simply be a renamed existing document. In this instance, the old version may be assumed to be an empty document. Therefore, in step 450, the dafs 130 may select a new base document for computing a diff using, for example, techniques described in the application entitled Semantic Hashing, incorporated by reference above.

One or more of the steps of the methods 300 and 400 may be performed by one or more computer programs. The computer programs may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be operable to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Figure 5:
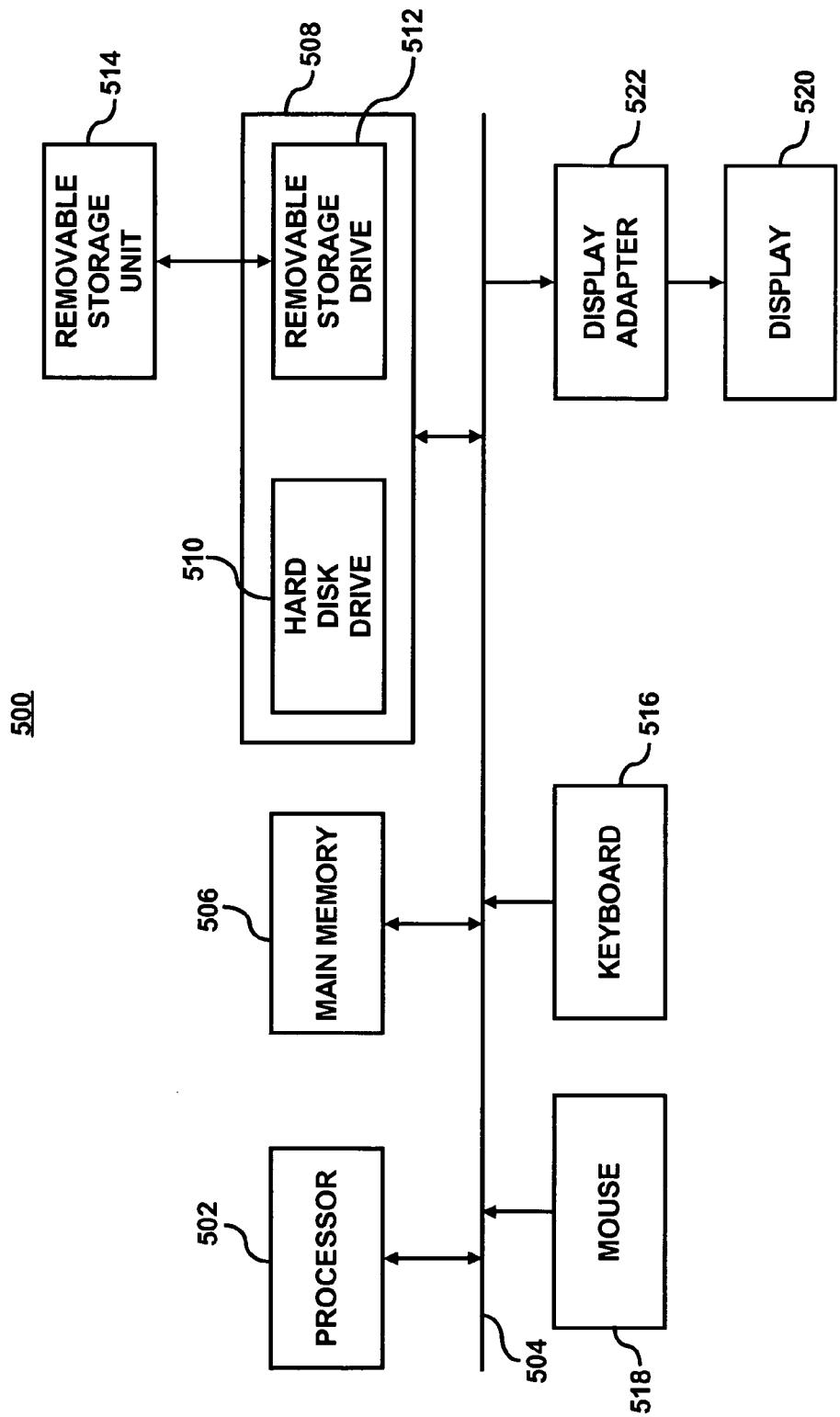
FIG. 5 illustrates a computer platform for a node in a P2P system, according to an embodiment of the invention.

FIG. 5 illustrates an exemplary computer platform 500, according to an embodiment of the invention for any of the nodes 120a . . . m or any of the clients 110a . . . n. The platform includes one or more processors, such as the processor 502, that provide an execution platform for software. The software, for example, may execute the steps of the method 500, perform standard P2P functions, etc. Commands and data from the processor 502 are communicated over a communication bus 504. The platform 500 also includes a main memory 506, such as a Random Access Memory (RAM), where the software may be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the may be stored. The removable storage drive 512 reads from and/or writes to a removable storage unit 514 in a well-known manner. A user interfaces may interface with the platform 500 with a keyboard 516, a mouse 518, and a display 520. The display adapter 522 interfaces with the communication bus 504 and the display 520 and receives display data from the processor 502 and converts the display data into display commands for the display 520.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A semantic-based system comprising:
   at least one client operable to issue a semantic query; and
   a file system connected to the at least one client via a network, wherein the file system stores objects and semantic information for the objects that is searchable to execute the semantic query;
   wherein the semantic information includes semantic vectors for the objects, each semantic vector identifying predetermined features for an associated object and created from the predetermined features for the associated object, and
   wherein the file system is a distributed archival file system operable to store a plurality of base files, each of a plurality of new versions of the base files in the form of a difference between each of the plurality of the new versions and an associated one of the base files, and semantic information for each of the plurality of the new versions and base files;
   wherein the semantic query includes a semantic vector stored in the distributed archival file system for one of the objects.

2. The semantic-based system of claim 1, wherein the semantic vectors are searchable to identify objects having similar predetermined features.

3. The semantic-based system of claim 1, wherein the file system further comprises a semantic catalogue including each semantic vector, an associated object name and a location of the associated object in the file system.

4. The semantic-based system of claim 1, wherein the file system comprises at least one extractor for creating a semantic vector for each of the objects of a specific file type.

5. The semantic-based system of claim 4, wherein the file system comprises an extractor registry identifying each extractor in the file system.

6. The semantic-based system of claim 5, wherein the extractor registry is operable to add or remove an extractor from the file system.

7. The semantic-based system of claim 1, wherein the distributed archival file system is overlaid on a peer-to-peer network comprising a plurality of nodes.

8. A distributed file system comprising:
   a plurality of nodes storing objects, wherein the objects include at least a first object, and a second object identifying a new version of the first object, the second object is stored as a difference between the new version of the first object and the first object;
   at least one extractor extracting semantic information for the objects; and
   a semantic catalogue including the semantic information for the objects, the semantic catalogue being stored in the plurality of nodes;
   wherein the semantic information includes semantic vectors for the objects, wherein each semantic vector identifies predetermined features for an associated object and is created from the predetermined features for the associated object; the semantic catalogue further includes a name for each of the objects, a unique identifier different from the name for each of the objects, and a version number for each of the objects that are associated with an associated one of the semantic vectors;
   wherein the distributed file system is operable to execute a semantic-based query, the semantic-based query includes a semantic vector in the semantic catalogue stored in the plurality of nodes.

9. The distributed file system of claim 8, wherein the distributed file system is overlaid on a peer-to-peer network comprising the plurality of nodes.

10. The distributed file system of claim 8, wherein the semantic catalogue is distributed among the nodes.

11. A node in a semantic-based distributed file system, the node comprising:
    a processor;
    a storage device storing objects, wherein the objects includes at least a first object, and a second object identifying a new version of the first object, the second object is stored as a difference between the new version of the first object and the first object;
    a semantic catalogue containing semantic information for the objects; and an extractor, wherein the processor is operable to execute the extractor for extracting and creating the semantic information contained in the semantic catalogue; wherein the semantic information includes semantic vectors for the objects, wherein each semantic vector identifies predetermined features for an associated object and is created from the predetermined features for the associated object;

wherein the semantic-based distributed file system is operable to execute a semantic-based query, the semantic-based query includes a semantic vector stored in the distributed file system.

12. The node of claim 11, wherein the semantic catalogue comprises at least one entry, the at least one entry including an object name, semantic information for the object, and location of the object.

13. A method for searching a semantic-based file system storing a plurality of objects, the method comprising steps of:
creating a semantic vector associated with each of the plurality of objects stored in the semantic-based file system from predetermined features of the associated object using a latent semantic indexing technique;
storing the created semantic vectors in the file system;
receiving a semantic query, the semantic query includes one of the created semantic vectors;
searching semantic vectors stored in the file system for semantic vectors similar to the one created semantic vector in the semantic query;
generating a result of the search;
receiving a new version of one of the plurality of objects stored in the semantic-based file system;
computing a difference between the new version and the one object;
comparing the difference to a predetermined threshold; and
storing the difference in the semantic-based file system in response to the difference being less than the threshold.

14. The method of claim 13, wherein the semantic-based file system stores a semantic catalogue including an entry for each of the plurality of objects, each entry comprising an object name, a semantic vector associated with the object and the location of the object.

15. The method of claim 14, wherein the step of searching further comprises searching the semantic catalogue for the at least one semantic.

16. The method of claim 15, wherein the step of generating a result further comprises steps of:
identifying at least one object from the catalogue meeting the semantic query;
identifying the location of the at least one object; and
retrieving the at least one object from the location.

17. The method of claim 13, further comprising:
selecting a new object in response to the difference being greater than the predetermined threshold, the new object having similar semantics to the new version;
computing a second difference between the new version and the new object; and
storing the second difference in response to the second difference not being greater than the threshold.

18. The method of claim 17, wherein the selecting the new object comprises:
generating a semantic vector for the new version;
comparing the semantic vector for the new version to semantic vectors for other objects stored in the file system by calculating a Euclidian distance between the semantic vector for the new version and the semantic vectors for the other objects stored in the file system;
identifying one of the semantic vectors for other objects in the plurality of objects stored in the semantic-based filed system that is similar to the semantic vector for the new version; and
selecting the object associated with the identified semantic vector.

19. A semantic-based file system comprising:
means for receiving a semantic query, the semantic query includes a semantic vector stored in the semantic-based file system;
means for searching semantic vectors stored in the semantic-based file system for semantic vectors similar to the semantic vector in the semantic query, wherein each semantic vector is associated with one of the plurality of objects stored in the semantic-based file system and created from predetermined features extracted from the associated object; and
means for generating a result of the search.

20. The semantic-based file system of claim 19 storing a semantic catalogue including an entry for each of the plurality of objects, each entry comprising an object name, a semantic vector associated with the object and the location of the object.

21. The semantic-based file system of claim 20, wherein the means for searching is operable to search the semantic catalogue for the at least one semantic.

22. The semantic-based file system of claim 20, wherein the means for generating a result further comprises:
means for identifying at least one object from the catalogue meeting the query;
means for identifying the location of the at least one object; and
means for retrieving the at least one object from the location.

* * * * *

UNITED STATES PATENT AND TRADEMARK OFFICE
CERTIFICATE OF CORRECTION

PATENT NO. : 7,421,433 B2  
APPLICATION NO. : 10/284093  
DATED : September 2, 2008  
INVENTOR(S) : Zhichen Xu et al.

Page 1 of 1

It is certified that error appears in the above-identified patent and that said Letters Patent is hereby corrected as shown below:

In column 4, line 6, delete "daib" and insert -- dafs --, therefor.

In column 7, line 38, delete "for the" before -- may --.

Signed and Sealed this

Thirteenth Day of January, 2009

JON W. DUDAS  
*Director of the United States Patent and Trademark Office*